United States Patent
Chen et al.

(10) Patent No.: US 10,169,112 B2
(45) Date of Patent: Jan. 1, 2019

(54) EVENT SEQUENCE MANAGEMENT

(71) Applicant: International Business Machines Corporation, Armonk, NY (US)

(72) Inventors: Peng Fei Chen, Beijing (CN); Tong Tm Jia, Beijing (CN); Fan Jing Meng, Beijing (CN); Jing Min Xu, Beijing (CN); Lin Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 15/493,249

(22) Filed: Apr. 21, 2017

(65) Prior Publication Data
US 2018/0307544 A1  Oct. 25, 2018

(51) Int. Cl.
*G06F 3/00* (2006.01)
*G06F 9/54* (2006.01)

(52) U.S. Cl.
CPC .................... *G06F 9/542* (2013.01)

(58) Field of Classification Search
CPC ....................................... G06F 9/542
USPC ............................................... 719/318
See application file for complete search history.

(56) References Cited

U.S. PATENT DOCUMENTS

| 2006/0265257 A1* | 11/2006 | Pulfer ................... G06Q 10/06 705/7.28 |
| 2014/0282574 A1 | 9/2014 | Marathe et al. |
| 2016/0179600 A1 | 6/2016 | Joshi et al. |
| 2017/0068934 A1* | 3/2017 | Bos .................... G06Q 10/1097 |

OTHER PUBLICATIONS

Sherri K. Harms, Discovering Representative Episodal Association Rules from Event Sequences Using Frequent Closed Episode Sets and Event Constraints (Year: 2001).*
Gaaloul et al., "Discovering Workflow Patterns From Timed Logs". Information Systems in E-Business and E-Government—EMISA 2004, Oct. 2004, Luxembourg/Luxembourg, 2004, pp. 84-94.
Lou et al., "Mining Program Workflow From Interleaved Traces". Proceedings of the 16th ACM SIGKDD international conference on Knowledge discovery and data mining, Washington, D.C., Jul. 25-28, 2010, pp. 613-622.

* cited by examiner

*Primary Examiner* — Lechi Truong
(74) *Attorney, Agent, or Firm* — Law Office of Jim Boice

(57) ABSTRACT

A computer-implemented method obtains an action sequence that includes a plurality of actions executed on behalf of a plurality of users for achieving at least one goal. An event sequence that includes a plurality of events associated with types of the plurality of actions is generated from the obtained action sequence. An association model based on the generated event sequence is determined. The association model defines a chronological relationship among events associated with the at least one goal.

14 Claims, 5 Drawing Sheets

EVENT SEQUENCE MANAGEMENT

BACKGROUND

The present disclosure generally relates to event sequences. Specifically, the present disclosure relates to methods and systems for event sequence management.

Modern software systems are getting increasingly large and complex, such that these systems often contain hundreds of components and support concurrent access by a large number of users. In order to ensure the availability and performance of such systems, monitoring the actions history by the users is crucial in the system maintenance. This action history may be helpful in understanding situations in the systems and potential problems. Actions that are executed by the users may indicate the execution paths for achieving various goals, and thus the actions history is an important source for problem detection and diagnosis. How to analyze the action history and obtain a correct execution path of events for achieving a goal becomes very important and difficult.

SUMMARY

In one or more embodiments of the present invention, a computer-implemented method obtains an action sequence that includes a plurality of actions executed on behalf of a plurality of users for achieving at least one goal. An event sequence that includes a plurality of events associated with types of the plurality of actions is generated from the obtained action sequence. An association model based on the generated event sequence is determined. The association model defines a chronological relationship among events associated with the at least one goal.

The described invention may also be implemented in a computer system and/or as a computer program product.

DETAILED DESCRIPTION

Principle of the present disclosure will now be described with reference to some example implementations. It is to be understood that these implementations are described only for the purpose of illustration and help those skilled in the art to understand and implement the present disclosure, without suggesting any limitations as to the scope of the present disclosure. The disclosure described herein can be implemented in various manners other than the ones describe below.

As used herein, the term "includes" and its variants are to be read as opened terms that mean "includes, but is not limited to." The term "based on" is to be read as "based at least in part on." The term "one implementation" and "an implementation" are to be read as "at least one implementation." The term "another implementation" is to be read as "at least one other implementation." Other definitions, explicit and implicit, may be included below.

Some preferable implementations will be described in more detail with reference to the accompanying drawings, in which the preferable implementations of the present disclosure have been illustrated. However, the present disclosure can be implemented in various manners, and thus should not be construed to be limited to the implementations disclosed herein. On the contrary, those implementations are provided for the thorough and complete understanding of the present disclosure, and completely conveying the scope of the present disclosure to those skilled in the art.

Figure 1:
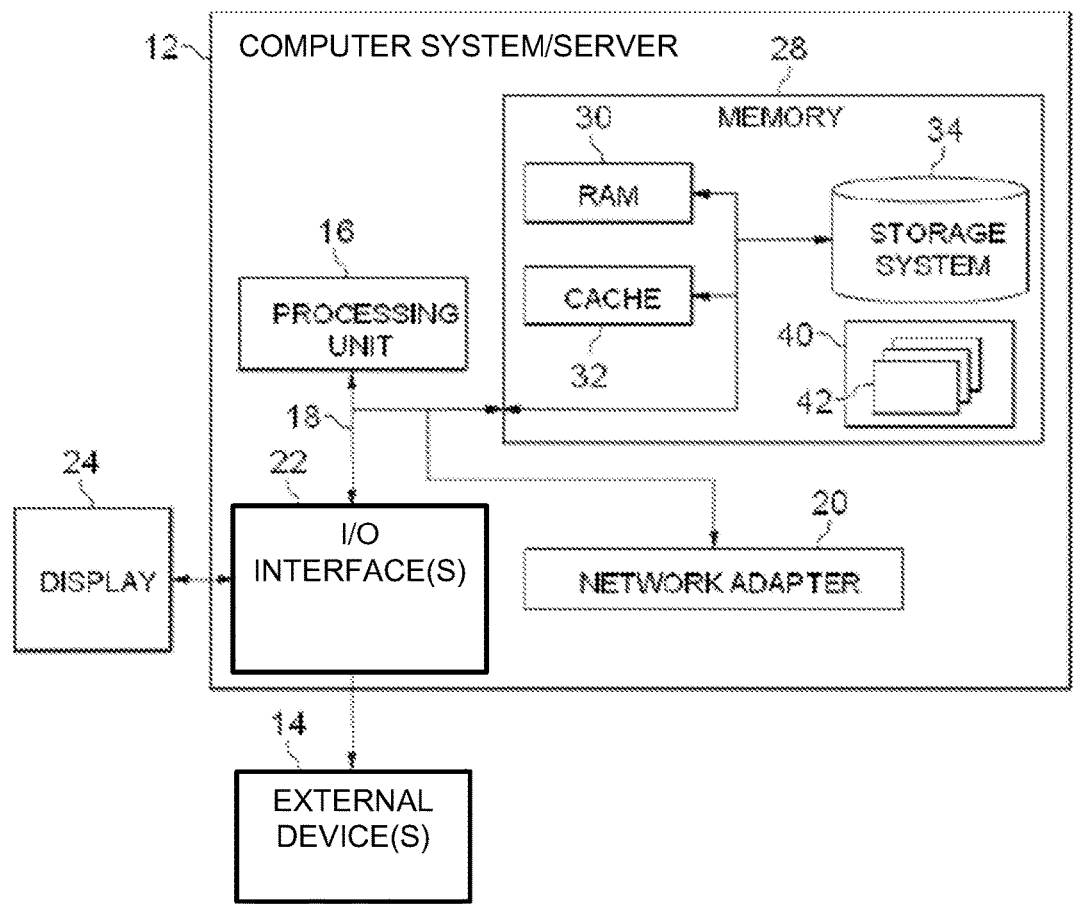
FIG. 1 schematically illustrates an exemplary computer system/server in which the present disclosure may be implemented.

With reference now to the figures, and in particular to FIG. 1, an exemplary computer system/server 12 which is applicable to implement the implementations of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors 16 or processing devices, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of various embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components may be used in conjunction with computer system/server 12. Examples, include, but are not limited to: microcode, device drivers, redundant processing units, external disk drive arrays, RAID systems, tape drives, data archival storage systems, etc.

For the purpose of description, detailed description will be presented to various embodiments of the present invention in an example environment of a plurality of users logging into a web application. It is to be understood that the environment is just for illustration and not for limitation purpose. The proposed approaches may also be applied to another type of application, as long as there is a need to analyze the action history of the users and the event sequence associated with actions of the users.

In an example environment, in order to permit a user to log into a web application, three actions may be executed: first the user ID and password may be submitted by the user, the database may be searched for the received ID and password, next based on the search result, the user may be accepted/rejected. Some approaches have been proposed to perform event sequence management. In a web application supporting parallel access by a plurality of users, if multiple users try to log into the web application concurrently, logs associated with a same type action (such as the above action) may be identified by a thread/process ID related to the user. Then, the actions from the multiple users may be monitored by tracing the thread/process ID. However, some web applications do not identify the thread/process ID in the log. If multiple users access this type of web application in parallel, the logs associated with different users may be interleaved. At this point, how to analyze the action history and obtain a correct execution path of events becomes a difficult question.

A new method and system for event sequence management are proposed herein. According to one or more embodiments of the present invention, an action sequence that includes a plurality of actions executed by a plurality of users for achieving at least one goal is obtained. Then, an event sequence that includes a plurality of events associated with types of the plurality of actions is generated from the obtained action sequence. Next, an association model is determined based on the generated event sequence, the association model defining a chronological relationship among events associated with the at least one goal.

Figure 2:
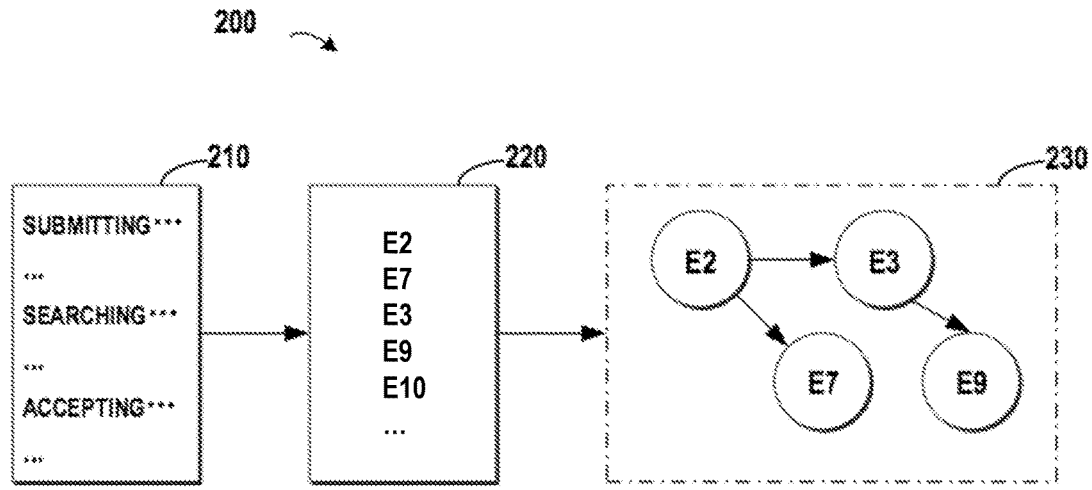
FIG. 2 schematically illustrates an exemplary diagram for event sequence management in accordance with one or more embodiments of the present invention.

FIG. 2 schematically illustrates an example diagram 200 for event sequence management according to one embodiment of the present invention. In FIG. 2, an action sequence 210 is obtained. In one implementation, the action sequence 210 may be determined from a log file of the web application. The present disclosure does not limit data structures of the action sequence 210; instead, any suitable data structures may be adopted in the implementation. Continuing the above example, if two users try to log in the web application in parallel, the actions from the two users may be interleaved. Table 1 illustrates an example data structure for storing the action sequence 210, where the action sequence 210 shows interleaved actions.

TABLE 1

Example of Action Sequence

| ID | Actions |
|---|---|
| 1 | Submitting (user1, psd1) |
| 2 | Checking . . . |
| 3 | Searching (user1, psd1) |
| 4 | Accepting (user1, psd1) |
| 5 | Submitting (user2, psd2) |
| 6 | Searching (user2, psd2) |
| 7 | Updating . . . |
| 8 | Accepting (user2, psd2) |
| . . . | . . . |

Table 1 includes two columns, where the first column indicates the ID of the action, and the second column indicates the content of the log of the action. In Table 1, the action sequence 210 includes multiple actions that are executed on behalf of the users: user 1 and user 2 who are logging into the web application. From the above Table 1, it is clear that the actions executed on behalf of user1 and user2 are interleaved with each other. For example, "Submitting (user1, psd1)" in line 1, "Searching (user1, psd1)" in line 3 and "Accepting (user1, psd1)" in line 4 are related to user1;"Submitting (user2, psd2)" in line 5 "Searching (user2, psd2)" in line 6, and "Accepting (user2, psd2)" in line 8 are related to user2; and "Checking . . . " and "Updating . . . " in lines 2 and 7 respectively may relate to other users for achieving other goals.

In some embodiments of the present invention, the action sequence 210 may include respective time points at which respective actions are executed. Although not illustrated in Table 1, there may be a third column for recording the time points.

With reference now to FIG. 2, the action sequence 210 may be processed for generating an event sequence 220. The event sequence 220 may be generated according to types of actions in the action sequence 210. Continuing the example of Table 1, both of the actions "Submitting (user1, psd1)" and "Submitting (user2, psd2)" may be represented by an event associated with the type "Submitting." The events in the event sequence 220 may be indicated by indicators of the events. For example, the type "submitting" may be indicated by "E2," the type "Searching" may be indicated by "E3" and the type "Accepting" may be indicated by "E10." Afterwards, an association model 230 may be determined according to the event sequence 220, where the association model 230 defines a chronological relationship among events associated with the at least one goal.

As indicated in the association model 230, the chronological relationship of "E2->E3->E9" may indicate that the events "Submitting," "Searching" and "Returning" should be executed so as to log into the web application. It is to be understood that although the proceeding paragraphs describe the implementation by taking three actions executed on behalf of the two users for logging into the web application as an example, in another implementation, the action sequence 210 may include more actions that are executed on behalf of more users for achieving more goals.

Figure 3:
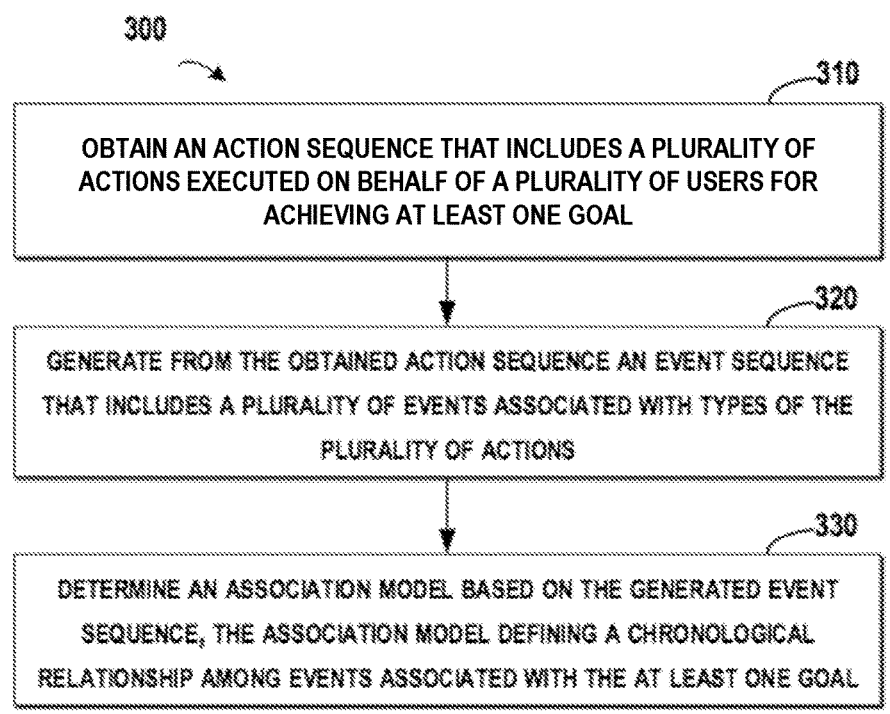
FIG. 3 schematically illustrates an exemplary flowchart of a method for event sequence management in accordance with one or more embodiments of the present invention.

FIG. 3 schematically illustrates an exemplary flowchart 300 for event sequence management according to one embodiment of the present invention. At 310, an action sequence 210 is obtained, where the action sequence 210 includes a plurality of actions executed on behalf of a plurality of users for achieving at least one goal. In one implementation, the action sequence 210 may be directly obtained from the log file of the web application. In another embodiment, the log file may be processed in advance to remove irrelevant information.

At 320, the event sequence 220 is generated from the obtained action sequence 210, where the event sequence 220 includes a plurality of events associated with types of the plurality of actions. Specifically, the actions in the action sequence 210 may be replaced by events associated with the types of the actions.

At 330, the association model 230 is determined based on the generated event sequence 220, where the association model 230 defines a chronological relationship among events associated with the at least one goal. In this embodiment, if the action sequence 210 covers a large time duration and includes lots of actions that are executed by lots of users for achieving a plurality of goals (for example, logging into the web application, modifying a profile in the web application, and the like), the determined association model 230 may provide the chronological relationships among the events that should be executed for achieving all these goals.

In one or more embodiments of the present invention, even if the thread/process IDs are not provided in the log file of the web application, the event sequence 220 associated with the types of actions may be generated and then the association model 230 may be determined based on the event sequence 220. Further, the association model 230 may be utilized for maintaining the web application and/or provide further information in troubleshooting.

In some embodiments of the present invention, the actions in the action sequence 210 may be replaced with events that are associated with the types of the action. Here, the action sequence 210 may be processed with respect to each of the types of the actions. Specifically, with respect to a specific action in the plurality of actions included in the action sequence 210, an event that is associated with a type of the specific action may be determined, and then the action sequence 220 may be updated by replacing the specific action with the determined event. After all the related types of actions are processed, the updated action sequence may be considered as the event sequence 220.

For example, each of the action types may be mapped to an event indicator according to a predefined mapping. In one embodiment, the mapping may be stored as illustrated in Table 2 below:

TABLE 2

Mapping between Event and Action Type

| Event Indicator | Action Type |
|---|---|
| ... | ... |
| E2 | Submitting |
| E3 | Searching |
| E5 | Updating |
| E7 | Checking |
| E9 | Accepting |
| ... | ... |

Based on the mapping illustrated in Table 2, the action sequence 210 of Table 1 may be converted into the event sequence 220 as illustrated below in Table 3.

TABLE 3

Example of Sequence

| ID | Events |
|---|---|
| 1 | E2 |
| 2 | E7 |
| 3 | E3 |
| 4 | E9 |
| 5 | E2 |
| 6 | E3 |
| 7 | E5 |
| 8 | E9 |
| ... | ... |

Figure 4:
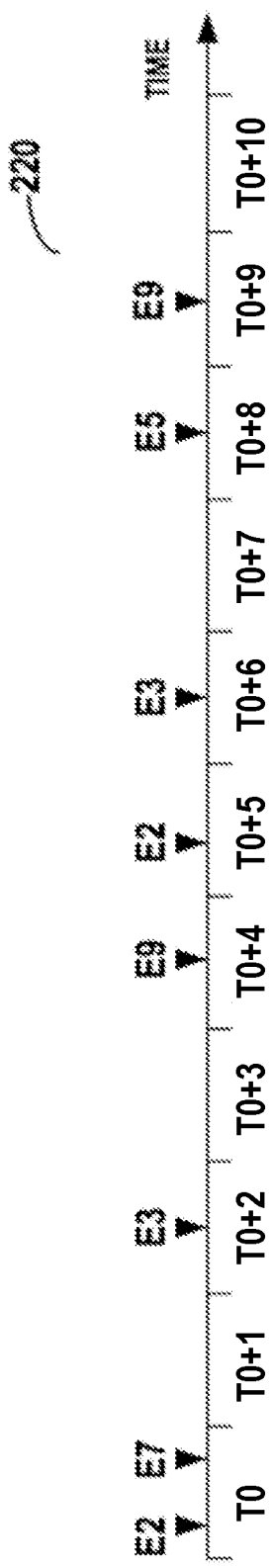
FIG. 4 schematically illustrates an example of an event sequence in accordance with one or more embodiments of the present invention.

FIG. 4 schematically illustrates an example of the event sequence 220 according to one embodiment of the present invention. In FIG. 4, the event sequence 220 is illustrated as a time sequence according to the chronological relationship of the time points at which events E2, E7, E3, E9, E2, E3, E5, E9, and so on happen. According to FIG. 4, the horizontal axis indicates the time, where only eleven time periods (the time periods T0 to T0+10) are illustrated. According to FIG. 4, the events E2 and E7 happen in T0, the event E3 happens in T0+2, and the time points at which the other events happen may be determined according to FIG. 4.

In some situations, if the event sequence 220 covers a long time period (for example, several days), there might be millions of events included in the event sequence 220. At this point, determining the association model 230 directly from the event sequence 220 will likely cost tremendous time and computing resources. Accordingly, a plurality of sub-sequences may be extracted from the event sequence 220, and then sub-models may be built from the sub-sequences.

In some implementations of the present disclosure, a plurality of sub-models may be built from a plurality of sub-sequences that are extracted from the event sequence 220, where one of the plurality sub-models defines a chronological relationship among events associated with a portion of the at least one goal. Further, the plurality of sub-models may be combined into the association model 230.

Various methods may be utilized in extracting the sub-sequence from the event sequence 220. In one embodiment, a value indicating the number of events included in the sub-sequence may be predefined in an extracting rule. For example, the extracting rule may define that the sub-sequence should include 4 events, and then a sub-sequence including the first events E2, E7, E3, and E9 may be extracted from the event sequence 220. In order to ensure that all the events in the event sequence 220 are considered in determining the association model, the multiple sub-sequences may be overlapped with each other to a certain extent. For example, another sub-sequence may include the events E9, E2, E3, and E5, where the event E9 exists in both of the sub-sequences. It is to be understood that the above extracting rule is an example and in other embodiments of the invention, the sub-sequence may be extracted according to other standards and there may be more or less events in each sub-sequence.

Figure 5:
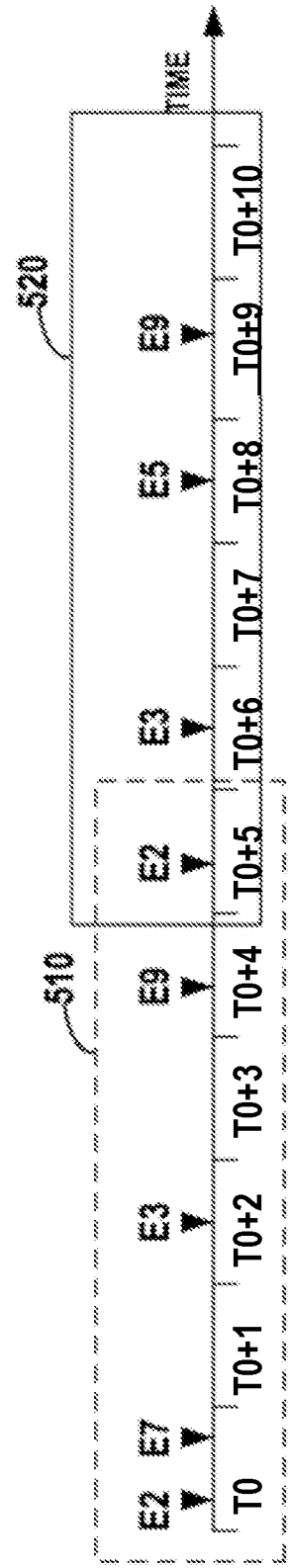
FIG. 5 schematically illustrates an exemplary diagram for extracting a plurality of sub-sequences from the event sequence of FIG. 4 in accordance with one or more embodiments of the present invention.

In some embodiments of the present invention, the sub-sequence may be extracted according to a predefined time window, such that the extracted sub-sequence may have a length of a predefined time window. Reference is made to FIG. 5, which schematically illustrates an example diagram for extracting a plurality of sub-sequences from the event sequence of FIG. 4 according to one embodiment of the present invention. In FIG. 5, the time window may be set to 6 time periods. Accordingly the first time window 510 may include the time periods T0 to T0+5, and the second window 520 may include the time periods T0+5 to T0+10. It is to be understood that the time window may have another length according to the specific requirements.

In some embodiments of the present invention, in order to find the chronological relationship related to a specific event, the specific event should be included in the sub-sequence, such that the events that are triggered by the specific event may be considered as candidates with which the specific event may have a chronological relationship. In these embodiments, with respect to a specific event of the plurality of events included in the event sequence, a group of sub-sequences that include the specific event may be extracted from the event sequence 220.

Figure 6:
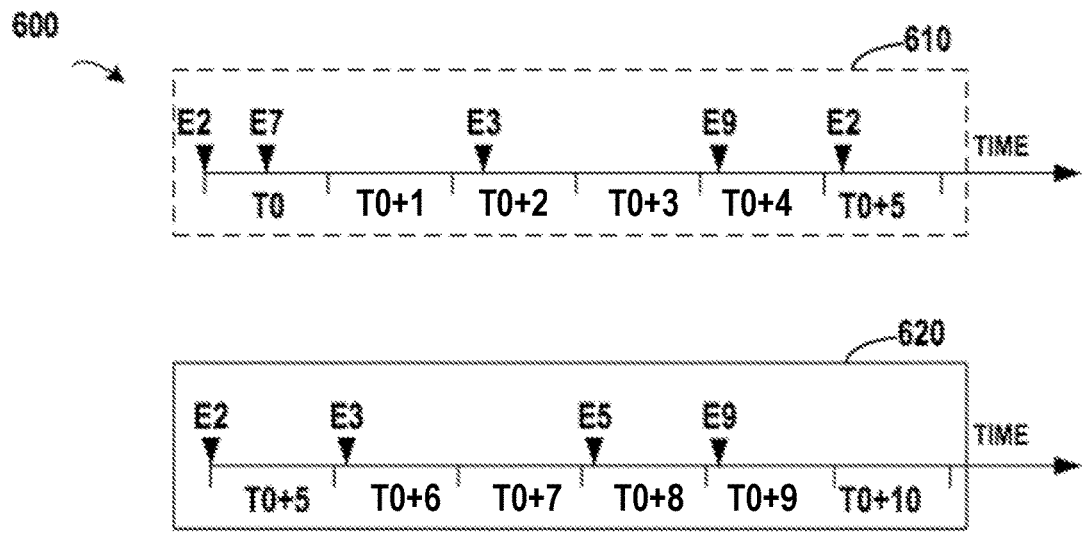
FIG. 6 illustrates a group of sub-sequences extracted from the event sequence of FIG. 5 in accordance with one or more embodiments of the present invention.

Referring to FIG. 5, the event E2 may be considered as the specific event and two sub-sequences 510 and 520 that include the event E2 may be extracted from the event sequence 220. FIG. 6 illustrates a group 600 including the sub-sequences 610 and 620, where the sub-sequences 610 and 620 are extracted from the event sequence of FIG. 5 according to one embodiment of the present invention. In FIG. 6, both the time window and the specific event E2 are considered in extracting the sub-sequences 610 and 620. The sub-sequence 610 starts from the event E2 and includes the events E2, E7, E3, E9 and E2, which covers the T0 to T0+5 and has a length of 6 time periods. The sub-sequence 620 also starts from the event E2 and includes the events E2, E3, E5, and E9, which covers the T0+5 to T0+10 and also has a length of 6 time periods.

Although FIG. 6 illustrates an example that the sub-sequences 610 and 620 start from the specific event E2, in another embodiment, a sub-sequence that ends at the specific event E2 may be extracted from the event sequence, or a sub-sequence that includes the specific event E2 in the middle may be extracted from the event sequence.

In the embodiment of the invention as shown in FIG. 6, a group 600 of sub-sequences which includes the sub-sequences 610 and 620 is determined from the event sequence 220. Then the sub-model may be built from the extracted group 600 of sub-sequences based on respective time points included in the sub-sequences. In each of the sub-sequences, the time points at which the events included in the sub-sequence may be determined, and then based on the time points, a chronological relationship among these events may be determined.

In some embodiments of the present invention, based on an occurrence of a first and a second event in the group of sub-sequences, an association degree between the first and second events may be determined. If the first and second events occur in a sub-sequence in the group, it may indicate that a chronological relationship exists between the first and second events. The degree of association may be determined to measure the reliability of the chronological relationship. It is to be understood that, in the context of the present disclosure, the occurrence of a first and a second event in the sub-sequence means that the first event happens first and is followed by the second event. For simplicity, the first and second events with a chronological relationship may be recorded in a two-tuples (first event, second event). Usually, the more times that the first event is followed by the second event, the stronger the chronological relationship is. Further, a smaller time gap/difference between the first and second events may indicate a stronger chronological relationship.

In some embodiments of the present invention, with respect to a specific sub-sequence in the group of sub-sequences, a time difference between the first and second events may be determined, and then the degree of association may be increased in response to the time difference being below a threshold. Details will be described by taking the sub-sequence 610 in FIG. 6 as an example. From FIG. 6, the sub-sequence 610 includes the events E2, E7, E3, E9 and E2. With respect to each pair of two events in the sub-sequence 610, the time difference may be determined. For example, both of the events E2 and E7 happen in the time period T0, and thus their time difference is 0. For the events E2 and E3, their time difference is (T0+2−T0)=2. For the events E2 and E9, their time difference s (T0+4−T0)=4. After determining the time difference between the events in the sub-sequence 610, a statistic result as shown in Table 4 may be determined.

TABLE 4

| | Time Difference | | | | |
|---|---|---|---|---|---|
| | E2 | E7 | E3 | E9 | E2 |
| E2 | — | 0 | 2 | 4 | 5 |
| E7 | — | — | 2 | 4 | 5 |
| E3 | — | — | — | 2 | 3 |
| E9 | — | — | — | — | 1 |
| E2 | — | — | — | — | — |

In the above Table 4, the first column indicates the first event, the first row indicates the second event, and the cell at the cross of the first and second events indicates the time difference between them. For example, the value "0" at the cross of E2 and E7 shows that the time difference between the events E2 and E7 is "0," and the value "1" at the cross of the events E9 and E2 shows that the time difference between E9 and E2 is "1." As mentioned in the preceding paragraphs, the less time difference between the first and second events, the stronger the chronological relationship is. Therefore, a threshold may be predefined to filter out a weak chronological relationship. If a threshold of "2" is predefined, the above Table 4 may be converted to Table 5 after filtering procedure. In Table 5, "TRUE" may indicate that there is a chronological relationship between the two related events.

TABLE 5

| | Chronological Relationships | | | | |
|---|---|---|---|---|---|
| | E2 | E7 | E3 | E9 | E2 |
| E2 | — | TRUE | TRUE | — | — |
| E7 | — | — | TRUE | — | — |
| E3 | — | — | — | TRUE | — |

TABLE 5-continued

Chronological Relationships

| | E2 | E7 | E3 | E9 | E2 |
|---|---|---|---|---|---|
| E9 | — | — | — | — | TRUE |
| E2 | — | — | — | — | — |

From Table 5, it shows that there are chronological relationships between (E2, E7), (E2, E3), (E7, E3), (E3, E9) and (E9, E2), where all the chronological relationships are determined from the sub-sequence 610. The above paragraphs describe how to determine the time differences for the events included in the sub-sequence 610, for the other sub-sequence 620 in the group 600, similar procedures may be performed and an individual table similar to Table 5 may be determined for the sub-sequence 620. The final association degree may be determined based on the two tables for the group 600. For example, if the chronological relationship between (E2, E3) is recorded 20 times as "TRUE" in the two tables, then the association degree between (E2, E3) may be determined as "20." For another example, if the chronological relationship between (E3, E9) is recorded 18 times as "TRUE" in the two tables, then the association degree between (E3, E9) may be determined as "18." Based on similar methods, the association degree among the events included in the group of sub-sequences may be determined.

It is to be understood that although the group 600 only includes two sub-sequences, in another embodiment, the group may include more sub-sequences. An individual table similar to Table 5 will be determined for each of the sub-sequences included in the group, and the final association degree may be determined based on all the tables for the group.

In some embodiments of the present invention, in response to the determined association degree being above a threshold, the first and second events and the determined association degree may be added into the sub-model. Continuing the above example, if the threshold is set to "15," then (E2, E3) with the association degree of 20 may be added into the sub-model because 20>15. Further, (E3, E9) with the association degree of 18 may be added into the association model because 18>15. Meanwhile, all the event pairs that have an association degree of less than 15 may not be added into the sub-model.

It is to be understood that the preceding paragraphs and FIGS. 4-7 are exemplary implementations for the purpose of illustration, but not for the purpose of limitation by taking the action sequence of Table 1 as an example. In another embodiment, other action sequences may be inputted. For example, based on another action sequence, one sub-sequence in the group of sub-sequences for E2 may include E2, E9, E3 and E9. Although E2 is followed by E9 in this sub-sequence, as the association degree determined from occurrence of (E2, E9) is below the predefined threshold "15," (E2, E9) should be filtered out and should not be added into the sub-model. By setting the threshold to a suitable value, the sub-model may be determined based on a statistic result of the actions of the users, and thus may provide a more accurate result.

Figure 7:
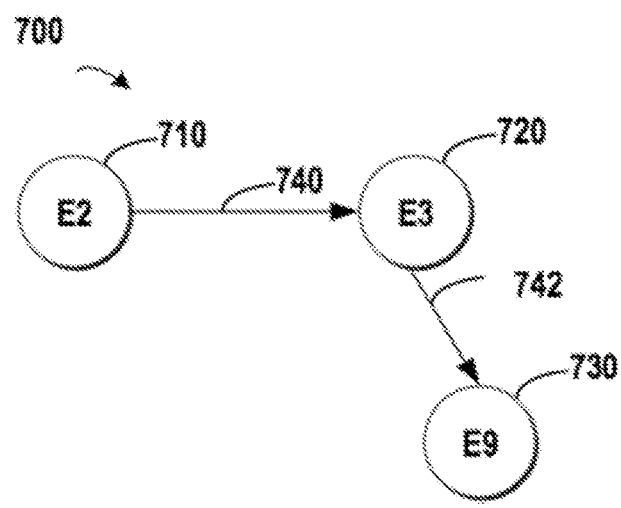
FIG. 7 illustrates an example of a sub-model determined from the sub-sequences of FIG. 6 in accordance with one or more embodiments of the present invention.

FIG. 7 illustrates an example of a sub-model 700 determined from the sub-sequences of FIG. 6 according to one implementation of the present disclosure. The sub-model 700 is obtained from the group 600 of the sub-sequences as illustrated in FIG. 6. In FIG. 7, nodes 710, 720 and 730 indicate the events E2, E3 and E9, respectively. A directed edge 740 indicates the association degree between the events E2 and E3, and a directed edge 742 indicates the association degree between the events E3 and E9. As shown in FIG. 7, the execution path including the events E2, E3 and E9 may show the necessary events for logging into the web application. First, the user ID and password may be submitted from the user, the database may be searched for the submitted ID and password, next based on the search result, the user may be accepted/rejected.

It is to be understood that logging into the web application is a single example of a goal. In another embodiment, if the action sequence includes all the actions that are executed from login to quit, then the association model may show the chronological relationships among events associated with other goals.

Although the preceding paragraphs describe how to determine one sub-model from one group of sub-sequence with reference to FIGS. 4-7, those skilled in the art may obtain another sub-model according to a similar procedure. For example, in order to obtain another sub-model related to the event E7, the event E7 may be selected as the specific event, and another group that includes a plurality of sub-sequences starting from the event E7 with a length of 6 time periods may be determined. Similarly, another sub-model may be determined from the further group.

Figure 8:
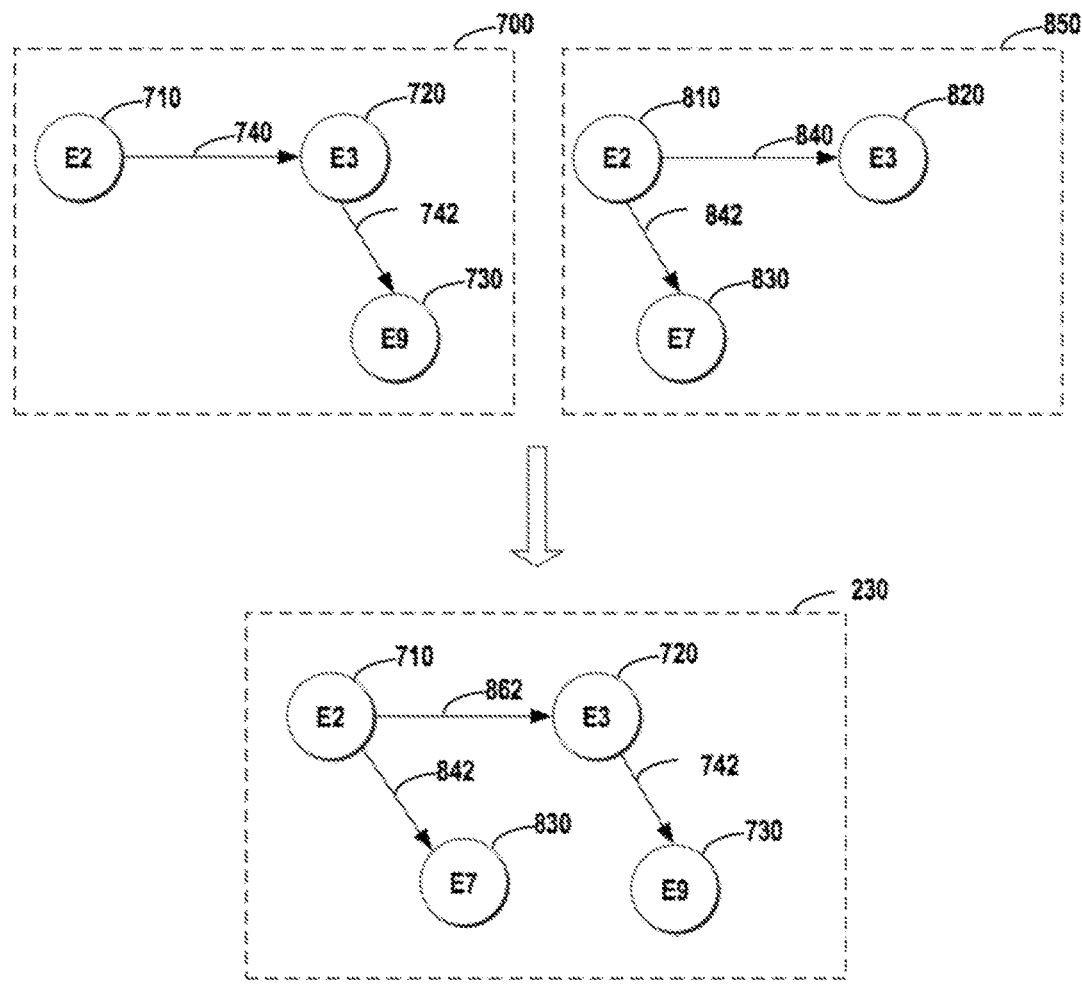
FIG. 8 illustrates an exemplary procedure for combining two sub-models into the association model in accordance with one or more embodiments of the present invention.

FIG. 8 illustrates an exemplary procedure for combining two sub-models into the association model according to one embodiment of the present invention. As shown in FIG. 8, the sub-model 700 is one sub-model built from one group of sub-sequences, and the sub-model 850 is another sub-model built from another group of sub-sequences. As the two sub-models 700 and 850 are both related to the event sequence 220, these sub-models 700 and 850 may be combined and form the association model 230 for the event sequence 220.

In some implementations of the present disclosure, in response to an event occurring in both a first and a second sub-model in the plurality of sub-models, the first and second sub-models may be combined into the association model. Referring to FIG. 8, in the sub-model 700, the node 710 indicates the event E2, while in the sub-model 850, the node 810 also indicates the same event E2. As the event E2 occurs in both of the sub-models, the two sub-models 700 and 850 may be combined into association model 230. From FIG. 8, the directed edge 842 in the sub-model 850 indicates that there is a chronological relationship between the event E7 indicated by the node 830 and the event E2, accordingly the node 830 and the directed edge 842 should be added into the association model 230.

In some embodiments of the present invention, the association degree in the combined association model may depend on the respective association degrees in the respective sub-models, and thus the association degrees in the association model may be updated according to association degrees in the first and second sub-models. Referring to FIG. 8, a directed edge 740 in the sub-model 700 indicates an association degree between the event E2 and E3, and a directed edge 840 in the sub-model 850 indicates another association degree between the event E2 and E3. At this point, in the association model 230, the association degree indicated by a directed edge 862 may be determined based on the values of the two association degrees indicated by the edges 740 and 840. In one implementation, a sum of the two associated degrees may be taken as the final association degree in the association model 230.

According to one embodiment of the present invention, a computer-implemented method is proposed. According to the method, an action sequence that includes a plurality of actions executed by a plurality of users for achieving at least one goal is obtained. An event sequence that includes a plurality of events associated with types of the plurality of actions is generated from the obtained action sequence. An association model based on the generated event sequence is determined. The association model defines a chronological relationship among events associated with the at least one goal.

According to one embodiment of the present invention, a computing system is proposed. The computing system comprises a computer processor coupled to a computer-readable memory unit, where the memory unit comprises instructions that when executed by the computer processor implements a method. According to the method, an action sequence that includes a plurality of actions executed by a plurality of users for achieving at least one goal is obtained. An event sequence that includes a plurality of events associated with types of the plurality of actions is generated from the obtained action sequence. An association model based on the generated event sequence is determined. The association model defines a chronological relationship among events associated with the at least one goal.

According to one embodiment of the present invention, a computer program product is proposed. The computer program product is tangibly stored on a non-transient machine-readable medium and comprising machine-executable instructions. When the instructions are executed on an electronic device, the electronic device is caused to: obtain an action sequence that includes a plurality of actions executed by a plurality of users for achieving at least one goal; generate from the obtained action sequence an event sequence that includes a plurality of events associated with types of the plurality of actions; and determine an association model based on the generated event sequence, the association model defining a chronological relationship among events associated with the at least one goal.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
    obtaining, by one or more processors, an action sequence that includes a plurality of actions executed on behalf of a plurality of users for achieving at least one goal;
    generating, by one or more processors, from the obtained action sequence an event sequence that includes a plurality of events, wherein the event sequence includes respective time points at which respective actions associated with respective events are executed, and wherein each of the plurality of events is associated with a unique type of action from the plurality of actions;
    determining, by one or more processors, an association model based on the generated event sequence, wherein the association model defines a chronological relationship among events associated with the at least one goal;
    building, by one or more processors, a plurality of sub-models from a plurality of sub-sequences that are extracted from the event sequence, wherein at least one of the plurality of sub-models defines a chronological relationship among events associated with a portion of the at least one goal;
    combining, by one or more processors, the plurality of sub-models into the association mode;
    for a specific event from the plurality of events included in the event sequence, extracting from the event sequence, by one or more processors, a group of sub-sequences that include the specific event;
    determining, by one or more processors, a sub-model from the extracted group of sub-sequences based on respective time points included in the sub-sequences; and
    selecting from the event sequence, by one or more processors, a sub-sequence that ends at the specific event for inclusion in the sub-model.

2. The computer-implemented method of claim 1, further comprising:
    for each action in the plurality of actions, determining, by one or more processors, an event that is associated with a particular type of the action;
    updating, by one or more processors, the action sequence by replacing the action from the plurality of actions with the determined event; and
    obtaining, by one or more processors, the updated action sequence as the event sequence.

3. The computer-implemented method of claim 1, further comprising:
    selecting from the event sequence, by one or more processors, a sub-sequence that starts at the specific event for inclusion in the sub-model.

4. The computer-implemented method of claim 1, further comprising:
    selecting from the event sequence, by one or more processors, a sub-sequence that has a length of a predefined time window for inclusion in the sub-model.

5. The computer-implemented method of claim 1, further comprising:
    in response to a first event and a second event occurring in the group of sub-sequences, determining, by one or more processors, an association degree between the first event and the second event; and
    in response to the determined association degree being above a first threshold, adding, by one or more processors, the first event and the second event having the determined association degree into the sub-model.

6. The computer-implemented method of claim 5, further comprising:
    for a specific sub-sequence in the group of sub-sequences, determining, by one or more processors, a time difference between the first event and the second event; and
    increasing, by one or more processors, the association degree in response to the time difference being below a second threshold.

7. The computer-implemented method of claim 1, further comprising:
    in response to an event occurring in both a first sub-model and a second sub-model in the plurality of sub-models, combining, by one or more processors, the first sub-model and second sub-model into the association model.

8. The computer-implemented method of claim 7, further comprising:

updating, by one or more processors, an association degree in the association model according to respective association degrees in the first sub-model and the second sub-model.

9. A computer system comprising a computer processor coupled to a computer-readable memory unit, the memory unit comprising instructions that when executed by the computer processor implements a method comprising:
   obtaining an action sequence that includes a plurality of actions executed on behalf of a plurality of users for achieving at least one goal;
   generating from the obtained action sequence an event sequence that includes a plurality of events, wherein the event sequence includes respective time points at which respective actions associated with respective events are executed, and wherein each of the plurality of events is associated with a unique type of action from the plurality of actions;
   determining an association model based on the generated event sequence, wherein the association model defines a chronological relationship among events associated with the at least one goal;
   building a plurality of sub-models from a plurality of sub-sequences that are extracted from the event sequence, wherein at least one of the plurality of sub-models defines a chronological relationship among events associated with a portion of the at least one goal;
   combining the plurality of sub-models into the association model;
   for a specific event from the plurality of events included in the event sequence, extracting from the event sequence a group of sub-sequences that include the specific event;
   determining a sub-model from the extracted group of sub-sequences based on respective time points included in the sub-sequences; and
   selecting, from the event sequence, a sub-sequence that has a length of a predefined time window for inclusion in the sub-model.

10. The computer system of claim 9, wherein the method further comprises:
   for each action in the plurality of actions, determining an event that is associated with a particular type of the action;
   updating the action sequence by replacing the action from the plurality of actions with the determined event; and
   obtaining the updated action sequence as the event sequence.

11. The computer system of claim 9, wherein the method further comprises:
   selecting, from the event sequence a sub-sequence that starts at the specific event for inclusion in the sub-model.

12. The computer system of claim 9, wherein the method further comprises:
   selecting, from the event sequence, a sub-sequence that ends at the specific event for inclusion in the sub-model.

13. The computer system of claim 9, wherein the method further comprises:
   in response to a first event and a second event occurring in the group of sub-sequences, determining an association degree between the first event and the second event; and
   in response to the determined association degree being above a first threshold, adding the first event and the second event having the determined association degree into the sub-model.

14. A computer program product being tangibly stored on a non-transient machine-readable medium and comprising machine-executable instructions, the instructions, when executed on an electronic device, causing the electronic device to:
   obtain an action sequence that includes a plurality of actions executed on behalf of a plurality of users for achieving at least one goal;
   generate from the obtained action sequence an event sequence that includes a plurality of events, wherein the event sequence includes respective time points at which respective actions associated with respective events are executed, and wherein each of the plurality of events is associated with a unique type of action from the plurality of actions;
   determine an association model based on the generated event sequence, wherein the association model defines a chronological relationship among events associated with the at least one goal;
   build a plurality of sub-models from a plurality of sub-sequences that are extracted from the event sequence, wherein at least one of the plurality of sub-models defines a chronological relationship among events associated with a portion of the at least one goal;
   combine the plurality of sub-models into the association mode;
   for a specific event from the plurality of events included in the event sequence, extract, from the event sequence, a group of sub-sequences that include the specific event;
   determine a sub-model from the extracted group of sub-sequences based on respective time points included in the sub-sequences; and
   selecting, from the event sequence a sub-sequence that has a length of a predefined time window for inclusion in the sub-model.

* * * * *